Oct. 30, 1962
E. E. WICKAM
3,061,073
CONVEYOR FOR FLUENT MATERIAL
Filed Dec. 24, 1959
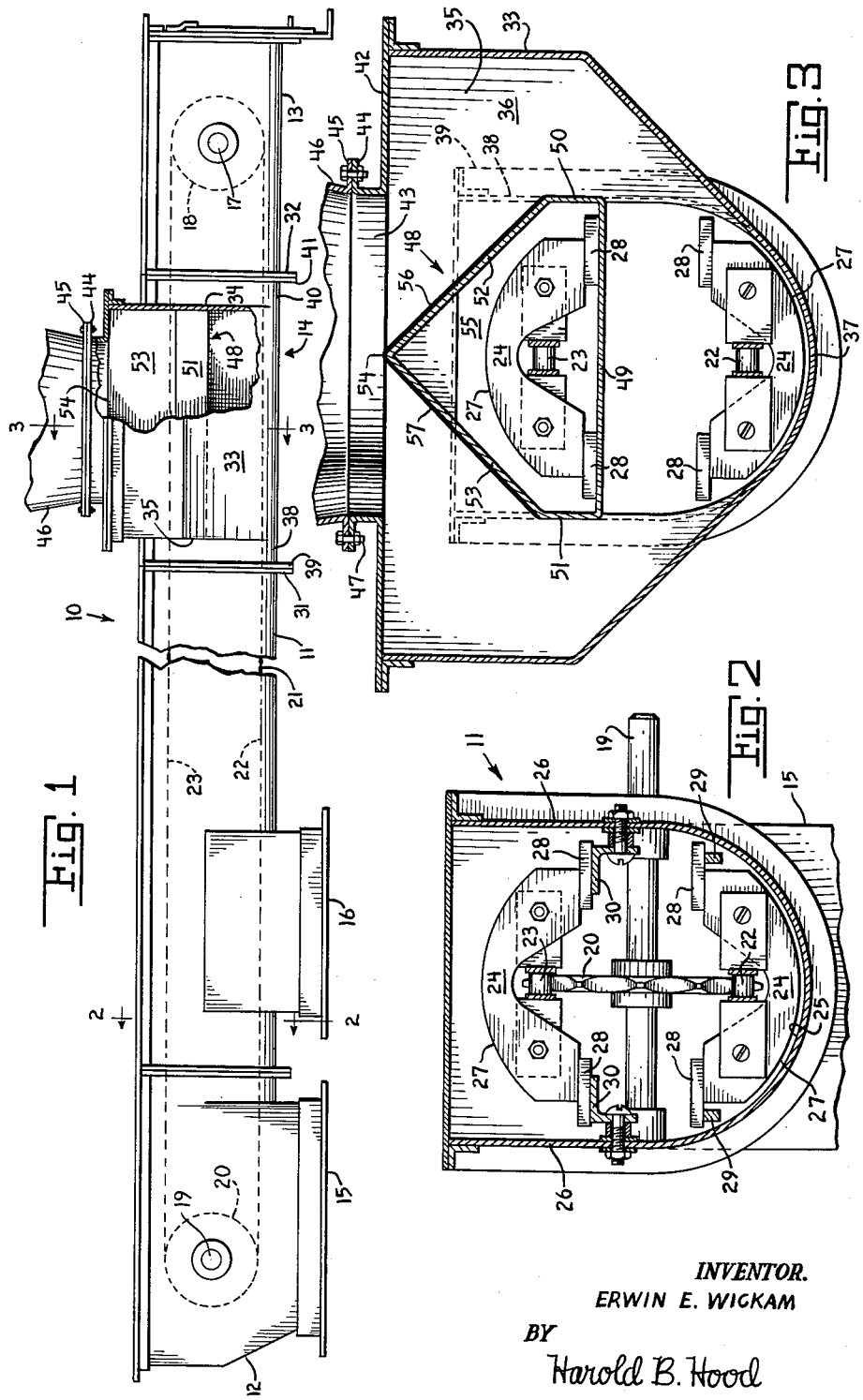
INVENTOR.
ERWIN E. WICKAM
BY
Harold B. Hood
ATTORNEY

United States Patent Office 3,061,073
Patented Oct. 30, 1962

3,061,073
CONVEYOR FOR FLUENT MATERIAL
Erwin E. Wickam, Enterprise, Kans., assignor to The J. B. Ehrsam & Sons Manufacturing Company, Enterprise, Kans., a corporation of Kansas
Filed Dec. 24, 1959, Ser. No. 861,893
2 Claims. (Cl. 198—52)

The present invention relates to conveyors for fluent material, and is particularly concerned with that type of conveyor in which an endless, flexible element, carrying pusher members, is arranged to cause the pusher members currently on its active run to move unidirectionally within a trough, with the pusher members cooperating with the floor and portions of the side walls of the trough, to move fluent material disposed in the trough, and with the return run of the endless element disposed above the active run. A primary object of the invention is to improve conveyors of the stated type.

A further object of the invention is to provide, in such a conveyor, means to guard against the entrainment of material introduced to the conveyor, upon the return run of the endless element, and thereby to guard against accumulation of unwanted material in the tail section of the trough. A further object of the invention is to provide means to improve the self-cleaning characteristics of a conveyor of the type under consideration, thereby facilitating the use of the conveyor, at different times, with different materials without substantial contamination.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is a side elevation of a conveyor constructed in accordance with the present invention, parts being broken away for clarity of illustration;

FIG. 2 is an enlarged transverse section taken substantially on the line 2—2 of FIG. 1; and FIG. 3 is a similarly enlarged section taken substantially on the line 3—3 of FIG. 1.

Referring more particularly to the drawings, it will be seen that I have illustrated a conveyor, indicated generally by the reference numeral 10, and comprising one or more trough sections 11, a delivery-end section 12, a tail section 13 and an inlet section 14. A delivery port is indicated at 15 while an intermediate discharge port, located in one of the sections 11, is indicated at 16. It is to be understood that the ports 15 and 16 may or may not be valved and that any desired number of ports 16 may be located at any desired positions within the length of the conveyor installation 10.

A shaft 17 traverses the tail section 13 and carries one or more sprockets 18; while a shaft 19 similarly traverses the delivery section 12 and carries a corresponding number of sprockets 20. Preferably, the shaft 17 will be mounted, in a well known manner, to permit its adjustment, longitudinally of the trough, to adjust the tension in one or more endless, flexible elements such as the chain 21 trained over the sprockets 18 and 20. In the illustrated form of the invention, the endless means comprises a single chain 21, the active run 22 of which is disposed closely adjacent the bottom of the trough and the return run 23 of which is disposed above the run 22.

At suitably spaced intervals within the length of the chain 21, blades or pusher members 24 are fixedly secured to the chain. As shown, the trough is preferably provided with a semi-cylindrical bottom wall 25 and vertical opposite side walls 26; and that edge 27 of each pusher member 24 which is remote from the plane containing the axes of the shafts 17 and 19 is shaped to conform to the contour of the wall 25. Preferably, each pusher member 24 is coated with rubber or rubberoid material, though alternatively the pusher members may be formed of synthetic plastic material, and the edges 27 of the pusher members currently on the active run of the endless means 21 will engage, or substantially engage, the internal surface of the floor 25 of the trough, the clearance between the pusher members and the trough floor being exaggerated in the drawings.

Each pusher member 24 carries, at its edge adjacent the plane containing the axes of the shafts 17 and 19, a pair of blocks 28 which likewise are coated with, or formed from, a rubberoid material or a synthetic plastic; and the outer surfaces of the blocks 28 engage, and are supported upon, rails 29 suitably mounted within the trough adjacent each port 15 or 16, whereby the pusher members are supported against "tripping" in the discharge ports. Similarly, the inner surfaces of the blocks 28 ride upon rails 30, suitably supported within the trough, whenever the pusher members are currently located upon the return run 23 of the endless element.

Conventionally, conveyor troughs generally of the character here under consideration are made up of standard lengths each of which is formed, at its opposite ends, with flanges like the flange 31 of section 11 and the flange 32 of section 13. According to the present invention, an inlet unit, indicated generally by the reference numeral 14, comprises a main body 33 having end walls 34 and 35 and side walls merging in a part-cylindrical section 37, to define a chamber 36 substantially larger, in transverse dimension, than the above-described trough. An extension 38 projecting from the end wall 35 conforms to the shape of the section 11 and terminates in a flange 39 adapted to be secured, in any suitable dust-tight fashion, to the flange 31 of a trough section 11. A similar extension 40 projects from the end wall 34 and terminates in a flange 41 adapted to be similarly secured to the flange 32 of the section 13. As will be apparent from an inspection of FIG. 3, the bottom wall 37 of the body 33 conforms to the shape of the bottom wall 25 of the section 11 and coincidently bridges the space between the bottoms of the sections 11 and 13.

The body 33 is provided with a roof 42 suitably secured thereto and formed to provide an upwardly opening mouth 43 bounded by a peripheral flange 44 to which the flange 45 of a supply spout 46 may be suitably secured, as by the bolts 47.

Within the chamber 36, and supported from the end walls 34 and 35, is mounted a baffle, indicated generally by the reference numeral 48. Said baffle is formed to provide a floor 49 laterally bounded by upstanding side walls 50 and 51 which merge with roof sections 52 and 53 which meet in an apex 54. The roof sections 52 and 53 flare from the apex line 54 laterally to lines disposed outwardly beyond the lateral edges of the pusher members 24; and the floor 49 is disposed substantially in the plane of the rails 30. The baffle 48 thus defines a tunnel 55 through which the return run of the endless element 21 is threaded as it passes the mouth 43 of the chamber 36. As will be seen from an inspection of FIG. 3, the apex line 54 of the baffle extends parallel to the axis of the trough and bisects the mouth 43 of the chamber 36. Since the baffle extends from end wall 34 to end wall 35 of the body 33 and is secured to said end walls, it completely houses the return run of the endless element 21 as the latter passes the mouth 43 of the inlet chamber, and therefore protects said return run against material which might otherwise fall upon, and be entrained by, said return run of the conveyor as that run moves toward and into the tail section 13. Fluent material delivered to the chamber 36 is thus divided and diverted by the baffle 48 and flows, laterally oppositely around said baffle, into the lower section of the chamber 36 and onto the bottom wall 37 thereof, where it is picked up by the advancing pusher elements 24 currently on the active run of the endless element 21, and is carried to and through the one or more sections 11 of the trough.

Preferably, the roof sections 52 and 53 are provided, on their exposed surfaces, with coatings 56 and 57 of rubberoid material to protect said sections 52 and 53 against the abrasive and erosive action of material delivered thereagainst from the spout 46. Preferably, said roof sections will be inclined at opposite angles to the horizontal at least equal to the slide angle of the material to be handled by the conveyor.

Throughout the present specification and the claims appended thereto, the term "fluent material" is used to define a discrete mass which will flow freely under the influence of gravity or other forces. Such materials include aggregates, rare earth, many dry chemicals and fertilizers, starch, coffee, sugar, grain, flour, feed, coal and salt, as well as other materials of similar physical characteristics. Conveyors of the type here under consideration have substantial advantages over conventional screw conveyors, particularly in the handling of materials which might be broken, disintegrated or otherwise damaged by the type of agitation which inevitably arises in the operation of screw conveyors; yet the trough of the conveyor herein disclosed is substantially identical in construction to the trough conventionally used in a screw conveyor and, in fact, the endless element and its associated parts, disclosed herein, can if desired be installed to replace the screw of an existing conventional screw conveyor.

I claim as my invention:

1. In a conveyor for fluent, discrete material, trough means for containing such material during transportation thereof, endless flexible means trained over supports longitudinally spaced relative to said trough means and comprising an active run disposed near the bottom of said trough means and a return run disposed in said trough means above said active run, a plurality of pusher elements carried by said endless means and spaced therealong, said pusher elements being so proportioned and arranged that pusher elements currently on the active run of said endless means conform to and coactively engage the bottom of said trough means, means for driving said endless means to move said active run unidirectionally longitudinally of said trough means, and an inlet unit interposed in said trough means and disposed wholly between the locations of said respective supports, said inlet unit being formed to provide a chamber whose bottom wall conforms to the bottom wall of said trough means and coincidently bridges spaced sections of said trough means bottom wall, said chamber having an upwardly-opening mouth through which said return run passes, and a baffle supported within said chamber, spaced from the lateral walls of said chamber and defining an open-ended tunnel extending longitudinally of said unit and disposed in the line of movement of said return run of said endless means, said tunnel having a floor disposed to support that section of said return run currently within said tunnel, and said baffle having a roof disposed between said unit mouth and said endless means, said baffle being so proportioned and arranged that material introduced through said mouth may fall freely past the lateral sides of said tunnel to the bottom of said chamber.

2. For use with a conveyor for fluent, discrete material comprising trough means for containing such material during transportation thereof, endless flexible means trained over supports longitudinally spaced relative to said trough means and comprising an active run disposed in said trough means and a return run disposed above said active run, a plurality of pusher elements carried by said endless means and spaced therealong, said pusher elements being so proportioned and arranged that pusher elements currently on the active run of said endless means conform to and coactively engage the bottom of said trough means, and means for driving said endless means to move said active run unidirectionally longitudinally of said trough means, an inlet unit interposed in said trough means and disposed wholly between the locations of said respective supports, said inlet unit being formed to provide a chamber whose bottom wall conforms to the bottom wall of said trough means and coincidently bridges spaced sections of said trough means bottom wall, said chamber having an upwardly-opening mouth, and a baffle supported within said chamber, spaced from the side walls of said chamber and defining an open-ended tunnel extending longitudinally of said unit and disposed in the line of movement of said return run of said endless means, said tunnel having a floor disposed to support that section of said return run currently within said tunnel, and said baffle having a roof disposed between said unit mouth and said endless means, said baffle being so proportioned and arranged that material introduced through said mouth may fall freely past the lateral sides of said tunnel to the bottom of said chamber.

References Cited in the file of this patent

UNITED STATES PATENTS

| | | |
|---|---|---|
| 1,338,514 | Majerus | Apr. 27, 1920 |
| 1,587,076 | Johnson | June 1, 1920 |
| 2,465,287 | Sinden | Mar. 22, 1949 |
| 2,624,474 | Hapman | Jan. 6, 1953 |
| 2,984,334 | Dungfelder et al. | May 16, 1961 |